(12) United States Patent
Watfa et al.

(10) Patent No.: US 9,811,843 B2
(45) Date of Patent: *Nov. 7, 2017

(54) SYSTEM AND METHOD FOR TARGETING USER INTERESTS BASED ON MOBILE CALL LOGS

(71) Applicant: Excalibur IP, LLC, Sunnyvale, CA (US)

(72) Inventors: Allie K. Watfa, Urbana, IL (US); Dale Nussel, Mahomet, IL (US); Mangesh Pardeshi, Champaign, IL (US); Jonathan Kilroy, Champaign, IL (US)

(73) Assignee: Excalibur IP, LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/421,257

(22) Filed: Jan. 31, 2017

(65) Prior Publication Data

US 2017/0140435 A1    May 18, 2017

Related U.S. Application Data

(63) Continuation of application No. 13/896,006, filed on May 16, 2013, now Pat. No. 9,582,815.

(51) Int. Cl.
G06Q 30/02 (2012.01)

(52) U.S. Cl.
CPC ..... *G06Q 30/0267* (2013.01); *G06Q 30/0269* (2013.01); *G06Q 30/0277* (2013.01)

(58) Field of Classification Search
None
See application file for complete search history.

(56) References Cited

U.S. PATENT DOCUMENTS

| | | | |
|---|---|---|---|
| 5,999,907 A | 12/1999 | Donner | |
| 8,577,000 B1* | 11/2013 | Brown | H04W 4/16 379/114.13 |
| 9,582,815 B2* | 2/2017 | Watfa | G06Q 30/0267 |
| 2007/0244750 A1* | 10/2007 | Grannan | G06Q 30/02 705/14.64 |
| 2008/0152097 A1* | 6/2008 | Kent | H04L 12/66 379/93.01 |
| 2008/0177626 A1* | 7/2008 | Nguyen | G06Q 10/107 705/14.39 |
| 2009/0268890 A1* | 10/2009 | Gupta | H04M 15/58 379/112.06 |
| 2010/0324996 A1* | 12/2010 | Kim | G06Q 30/0269 705/14.66 |
| 2011/0153428 A1* | 6/2011 | Ramer | G06Q 30/00 705/14.64 |

* cited by examiner

*Primary Examiner* — Matthew L Hamilton
*Assistant Examiner* — Shawn Lillemo
(74) *Attorney, Agent, or Firm* — Mauriel Kapouytian Woods LLP; Serge Krimnus; James Woods

(57) ABSTRACT

Techniques are provided that include targeting a user of a mobile electronic device with an interest-based advertisement, based at least in part on various call logs on a user device. Techniques are provided in which a set of calls from a user's call log from a mobile device are assigned to one or more categories indicative of potential user interests for the purposed of targeted advertisements. The usage pattern of the user's call log takes into account the time of the day, week, and/or month that the user tends to make particular calls to determine recurring patterns and calculate individual metrics for comparison with other users.

23 Claims, 5 Drawing Sheets

SYSTEM AND METHOD FOR TARGETING USER INTERESTS BASED ON MOBILE CALL LOGS

CROSS-REFERENCE TO RELATED APPLICATIONS

This application is a continuation of U.S. application Ser. No. 13/896,006, filed on May 16, 2013 in the United States Patent and Trademark Office, the entire disclosure of which is incorporated herein by reference.

BACKGROUND

Mobile advertising, including advertising in connection with various mobile electronic devices, poses many challenges. For example, getting the right advertisement to a particular user at the right time can increase impact on the user, relevance, advertisement performance, and revenue. Mobile devices possess the unique characteristics of always being powered on and constantly being carried with individual users, allowing a great deal of inference that could lead to beneficial advertising and social targeting and recommendation based on observed patterns of call logs and other mobile activity. Thus, there is a need for techniques for advertising in connection with mobile electronic devices.

SUMMARY

Some embodiments of the invention provide systems and methods that include targeting a user of a mobile electronic device with an interest-based advertisement, based at least in part on various call logs on a user device. Techniques are provided in which a set of calls from a user's call log from a mobile device are assigned to one or more categories indicative of potential user interests for the purposed of targeted advertisements. The usage pattern of the user's call log takes into account the time of the day, week, and/or month that the user tends to make particular calls to determine recurring patterns and calculate individual metrics for comparison with other users.

Some embodiments of the invention can be viewed as providing advantages in merging real-world geographical and physical aspects, including advertising in connection with physical stores, for example, through "virtual" aspects, such as aspects associated with wireless communications and wireless or online advertising generally.

While the invention is described with reference to the above drawings, the drawings are intended to be illustrative, and the invention contemplates other embodiments within the spirit of the invention.

DETAILED DESCRIPTION

Figure 1:
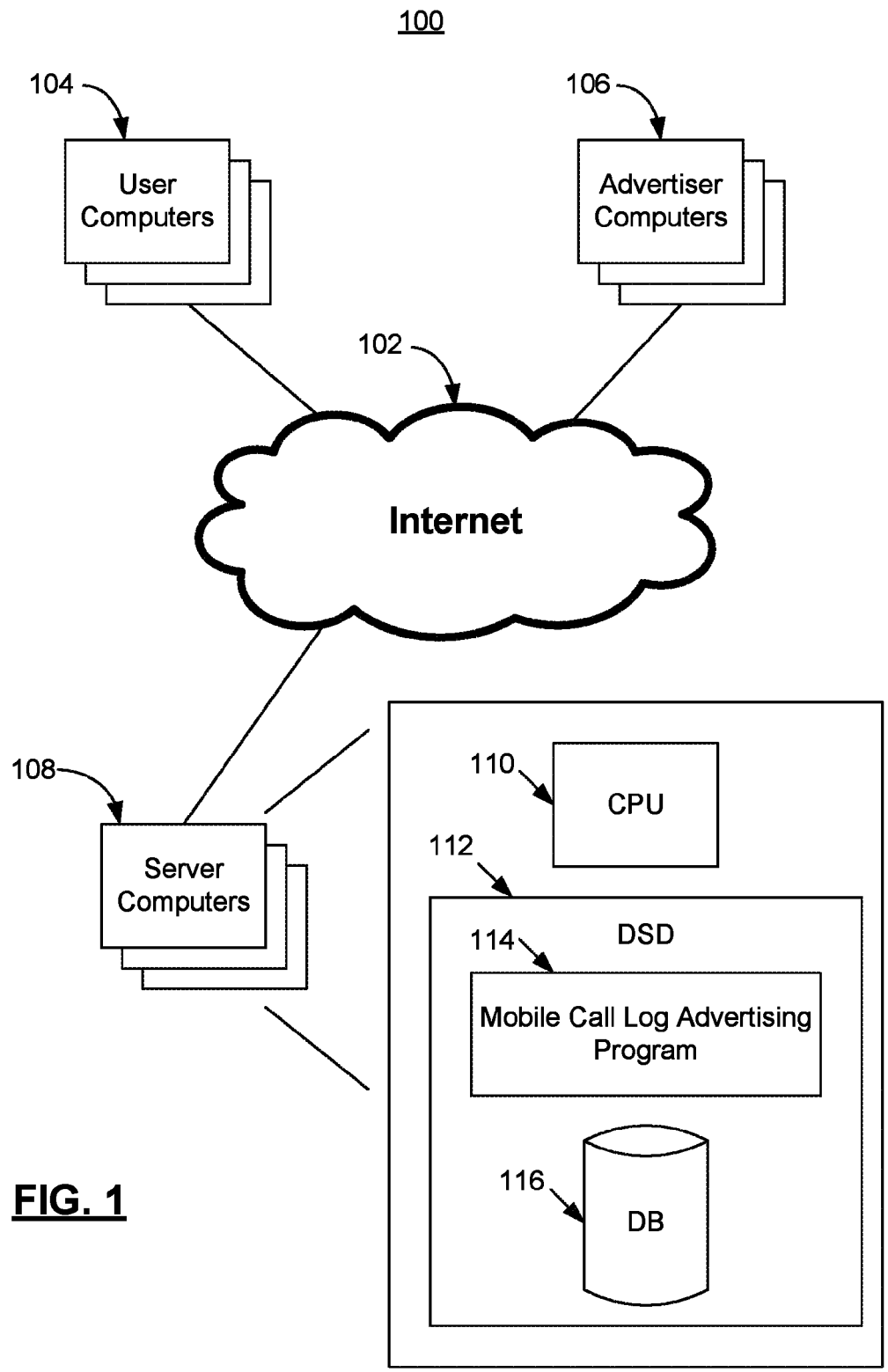
FIG. 1 is a distributed computer system according to one embodiment of the invention.

FIG. 1 is a distributed computer system 100 according to one embodiment of the invention. The system 100 includes user computers 104, advertiser computers 106 and server computers 108, all coupled or able to be coupled to the Internet 102. Although the Internet 102 is depicted, the invention contemplates other embodiments in which the Internet is not included, as well as embodiments in which other networks are included in addition to the Internet, including one more wireless networks, WANs, LANs, telephone, cell phone, or other data networks, etc. The invention further contemplates embodiments in which user computers or other computers may be or include wireless, mobile, or handheld devices such as PDAs, cell phones, smart phone, wireless computers, wireless computerized devices, laptop computers, tablet computers and computerized devices, electronic reading devices including ebook reader devices, etc.

Each of the one or more computers 104, 106, 108 may be distributed, and can include various hardware, software, applications, algorithms, programs and tools. Depicted computers may also include a hard drive, monitor, keyboard, pointing or selecting device, etc. The computers may operate using an operating system such as Windows by Microsoft, etc. Each computer may include a central processing unit (CPU), data storage device, and various amounts of memory including RAM and ROM. Depicted computers may also include various programming, applications, algorithms and software to enable searching, search results, and advertising, such as graphical or banner advertising as well as keyword searching and advertising in a sponsored search context. Many types of advertisements are contemplated, including textual advertisements, rich advertisements, video advertisements, etc.

As depicted, each of the server computers 108 includes one or more CPUs 110 and a data storage device 112. The data storage device 112 includes a database 116 and a Mobile Call Log Advertising Program 114.

The Program 114 is intended to broadly include all programming, applications, algorithms, software and other and tools necessary to implement or facilitate methods and systems according to embodiments of the invention. The elements of the Program 114 may exist on a single server computer or be distributed among multiple computers or devices.

Herein, the term "advertiser" is broadly intended to include individuals, companies or other entities, and to include agents and proxies of advertisers, other entities acting on behalf, partly on behalf of, or for the benefit of advertisers, etc.

Figure 2:
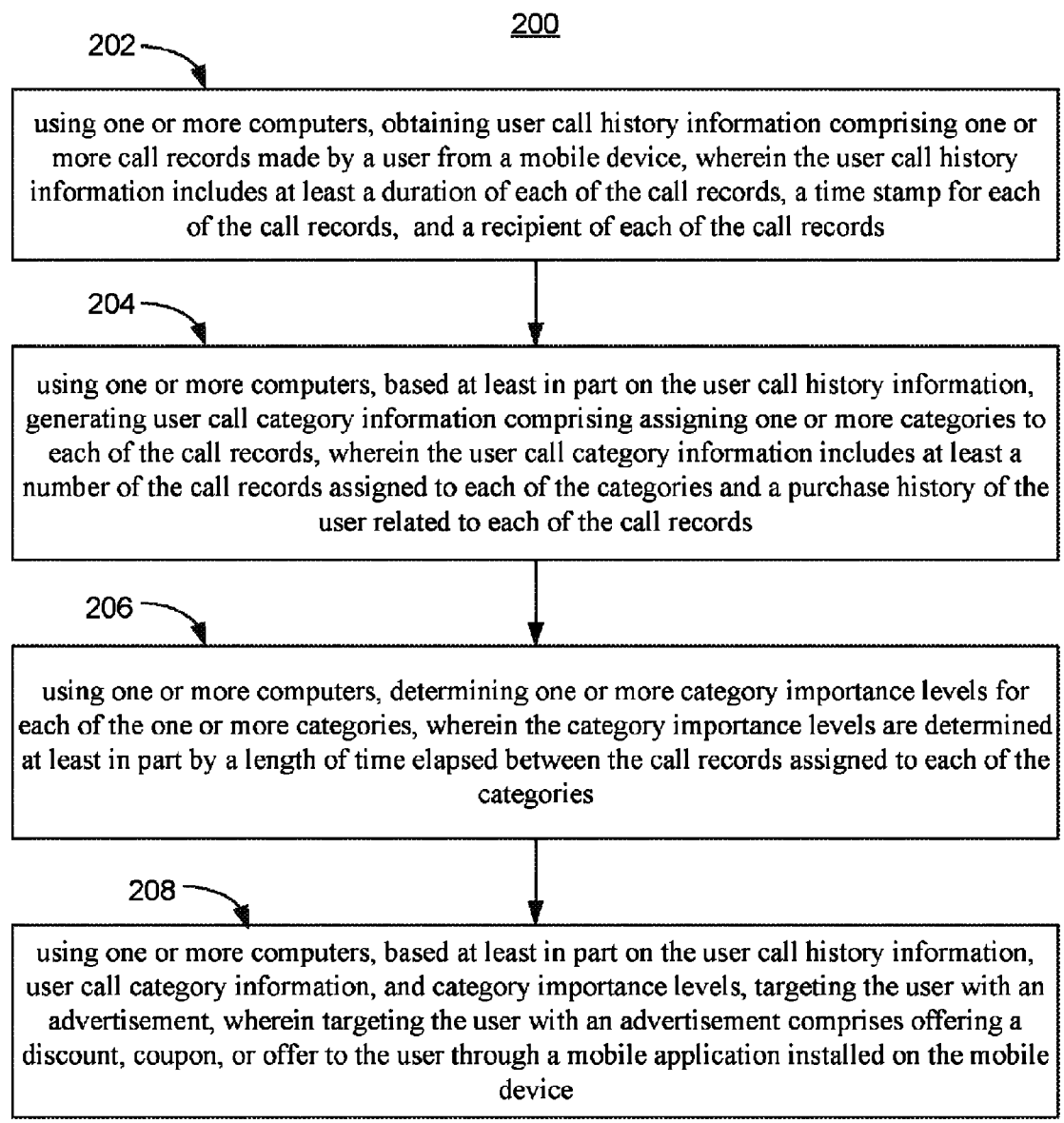
FIG. 2 is a flow diagram illustrating a method according to one embodiment of the invention.

FIG. 2 is a flow diagram illustrating a method 200 according to one embodiment of the invention. At step 202, using one or more computers, user call history information is obtained, comprising one or more call records made by a user from a mobile device, wherein the user call history information includes at least a duration of each of the call records, a time stamp for each of the call records, and a recipient of each of the call records.

At step 204, using one or more computers, based at least in part on the user call history information, user call category information is generated, comprising assigning one or more categories to each of the call records, wherein the user call category information includes at least a number of the call records assigned to each of the categories and a purchase history of the user related to each of the call records.

At step 206, using one or more computers, one or more category importance levels are determined for each of the one or more categories, wherein the category importance levels are determined at least in part by a length of time elapsed between the call records assigned to each of the categories.

At step 208, using one or more computers, based at least in part on the user call history information, user call category information, and category importance levels, the user is targeted with an advertisement, wherein targeting the user with an advertisement comprises offering a discount, coupon, or offer to the user through a mobile application installed on the mobile device.

Figure 3:
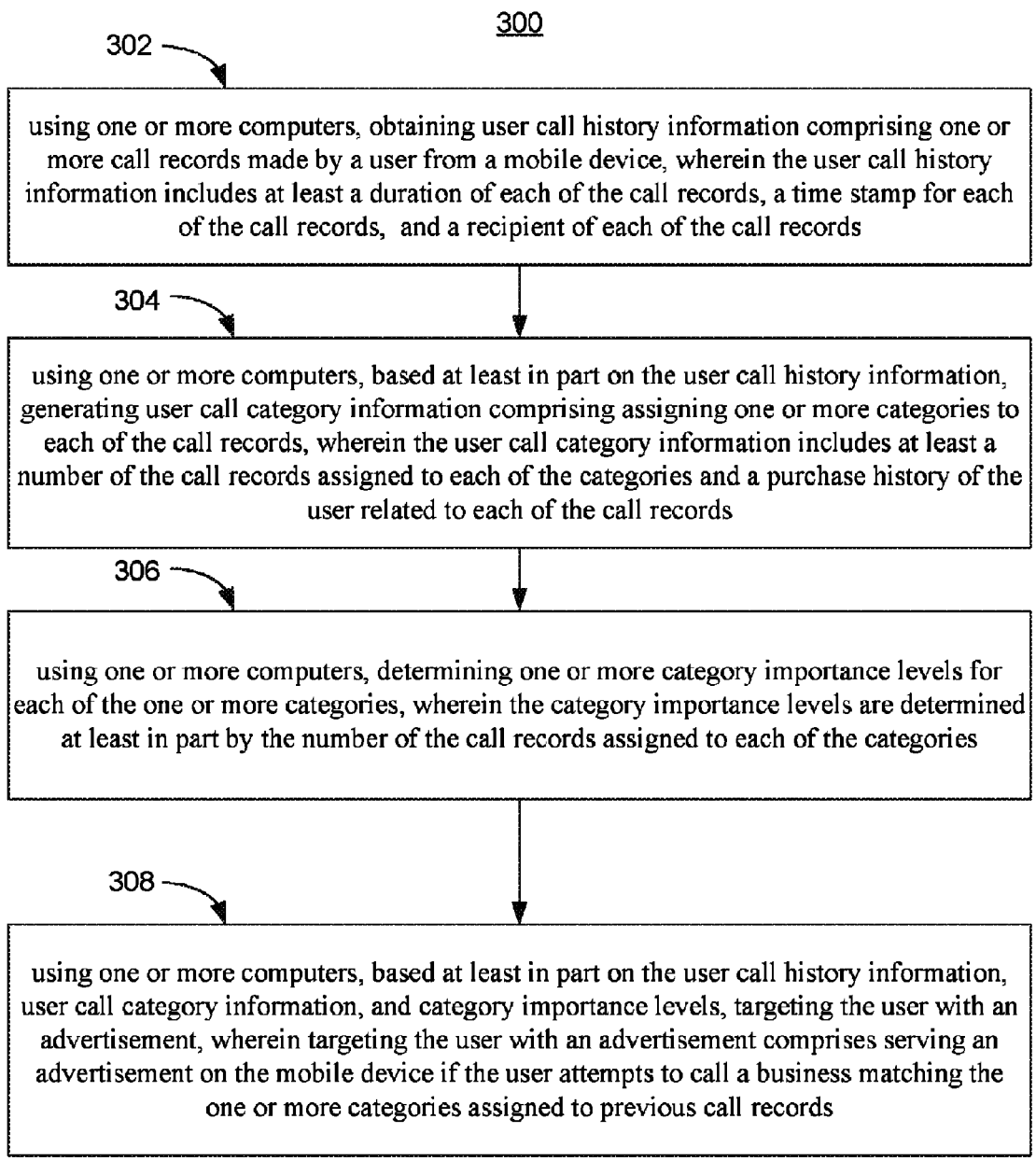
FIG. 3 is a flow diagram illustrating a method according to one embodiment of the invention.

FIG. 3 is a flow diagram illustrating a method 300 according to one embodiment of the invention. At step 302, using one or more computers, user call history information is obtained, comprising one or more call records made by a user from a mobile device, wherein the user call history information includes at least a duration of each of the call records, a time stamp for each of the call records, and a recipient of each of the call records.

At step 304, using one or more computers, based at least in part on the user call history information, user call category information is generated, comprising assigning one or more categories to each of the call records, wherein the user call category information includes at least a number of the call records assigned to each of the categories and a purchase history of the user related to each of the call records.

At step 306, using one or more computers, one or more category importance levels are determined for each of the one or more categories, wherein the category importance levels are determined at least in part by the number of the call records assigned to each of the categories.

At step 308, using one or more computers, based at least in part on the user call history information, user call category information, and category importance levels, the user is targeted with an advertisement, wherein targeting the user with an advertisement comprises serving an advertisement on the mobile device if the user attempts to call a business matching the one or more categories assigned to previous call records.

Figure 4:
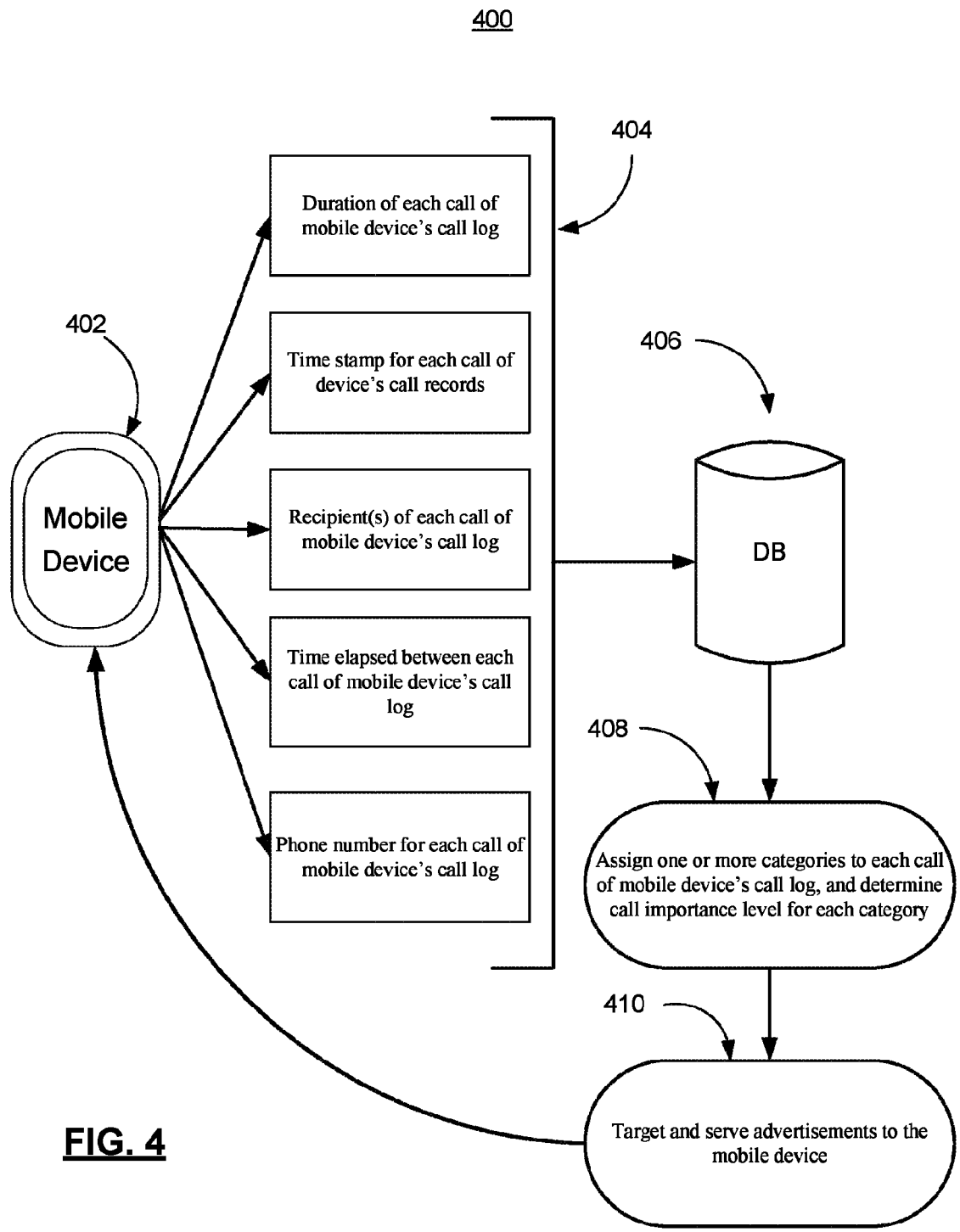
FIG. 4 is a block diagram illustrating one embodiment of the invention.

FIG. 4 is a block diagram 400 illustrating one embodiment of the invention. Block 402 represents a mobile device used to make phone calls and the various types of information stored by the mobile device 402, stored in one or more information folders 404 in the mobile device 402, and utilized. The information folders 404 include the duration of each call in the call log of the mobile device 402; the time stamp for each call in the call log of the mobile device 402; the recipient(s) of each call in the call log of the mobile device 402; the time elapsed between each call in the call log of the mobile device 402; and the phone number for each call in the call log of the mobile device 402.

Block 406 represents a database which is sent and obtains the various types of information stored in the information folders 404 of the mobile device 402. As represented by Block 408, based on the gathered information in the information folders 404, the database 406 assigns one or more categories to each call in the call log of the mobile device 402 and, furthermore, determines a call importance level for each category. The call importance level is based at least in part on the frequency, duration, and recipients of calls made by the mobile device 402 which are assigned to certain categories.

Block 410 represents the targeting and serving of advertisements, such as an electronic coupon or discount offer, to the mobile device 402, based in part on the information folders 404 of the mobile device 402 and the database's 406 assignment of categories and call importance levels for each call in the call log of the mobile device, represented by Block 408.

Figure 5:
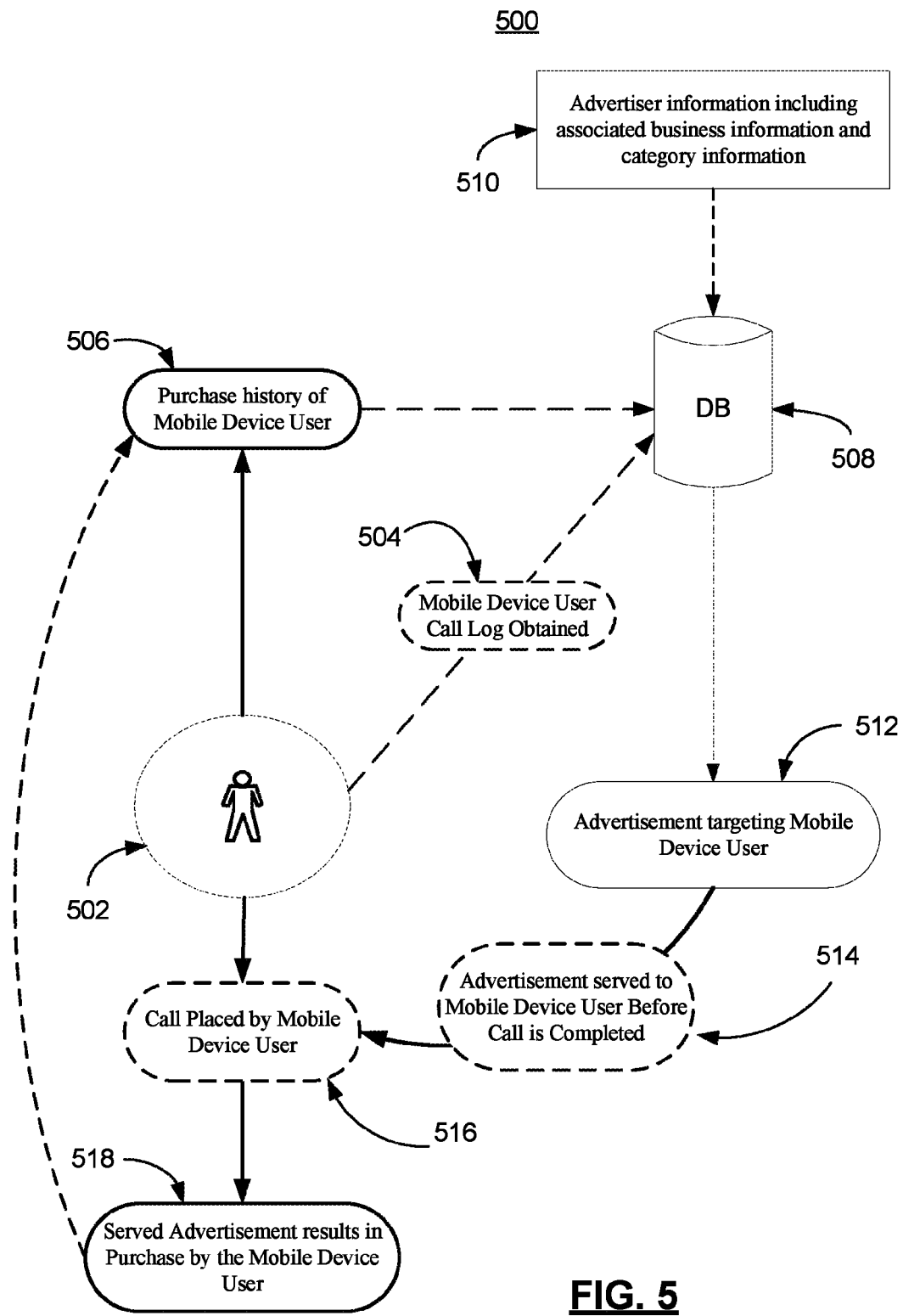
FIG. 5 is a block diagram illustrating one embodiment of the invention.

FIG. 5 is a block diagram 500 illustrating one embodiment of the invention. Block 502 represents a mobile mobile device user. Block 504 represents the call log of the mobile device user 502 being obtained by and stored in a database 508. The purchase history of the mobile device user 502, represented by Block 506, is also gathered and sent to the same database 508. The database 508 further obtains advertiser information, as shown in Block 510, the advertiser information including associated business information and category information for one or more advertisers. This advertiser information 510 will be utilized in conjunction with the purchase history of the mobile device user 506 and call log of the mobile device user 504 to determine a relevant advertisement to target the mobile device user 502 with, as represented by Block 512.

Once the mobile device user 502 places a call using a mobile device, as shown in Block 516, the targeted advertisement 512 is immediately served to the mobile device user 502 before the placed call 516 is completed, as represented by Block 514. The placed call 516 will at least in part determine which, if any, targeted advertisement 512 will be served prior before the placed call 516 is completed. This determination is based at least in part on the recipient of the placed call 516 and matching with the advertiser information including associated business information and category information, as shown in Block 510. The serving of the advertisement to the mobile device user 514 may result in a subsequent purchase, as shown in Block 518. This new purchase information is then further utilized to determine future targeted advertisements 512 as part of the purchase history associated with the mobile device user 506.

Some embodiment proposes provide techniques relating to selecting and providing advertisements such as electronic coupons to mobile users. In some embodiments, for example, for a user determined to be interested in a product and who is determined to have called, or to be about to call, a particular phone number associated with a call record in the user's call log or prior purchase, the user will be served with an advertisement including a best fit deal or coupon to use in purchasing a product or service from the phone number the user has called or is about to call. Additional factors in determining which advertisements will be served to users can include, for instance, various targeting criteria, predicted or forecasted advertisement performance, anticipated revenue associated with the advertisement, including revenue for a marketplace facilitator, etc. In some embodiments, any of various algorithms, models, etc., can be used in advertisement selection, for optimized advertisement selection. Furthermore, in some embodiments, the number of advertisements served to the user for a particular period of time is limited so as not to annoy, overwhelm or bombard the user with advertisements. Limited, optimized advertisements may be served, maximizing served advertisement performance by serving advertisements that match a user's immediate needs or interests and which are immediately and conveniently actionable.

Some embodiments include a recognition that many users who may be on the go with a mobile device may not have the ability to print the coupons and/or deals offered through targeted advertisements. Accordingly, some embodiments of the invention bring the best deal to the user in a purely electronic, convenient fashion, optimized to be redeemed through a mobile device and available for immediate use.

Some embodiments include utilizing geo-location historical pattern based advertisement targeting. For example, in some embodiments, the system may detect, based on a user's call log, that the user reserves a movie ticket every Saturday night, purchases groceries in a certain pattern, and/or takes a vacation to Hawaii during Thanksgiving. The system may use competitive bidding from hotels in the area, and a selected coupon for the winning hotel/advertiser may be served to the mobile device of the user.

Some embodiments of the invention include a number of detection, determination or calculation steps. Such steps can include elements relating to geodetection, time detection, interest detection, and advertisement, coupon or deal selection and determination, and in some embodiments may be performed in the foregoing order or prioritization order.

Some embodiments of the invention use various techniques and factors, and combinations of techniques and factors, for user interest detection, including detecting what a user may be interested in purchasing based on a user's call log and variables associated with categories of calls from the user's call log. For example, in some embodiments, calls made by a user over the weekend may be utilized in interest detection. For example, in some embodiments, techniques may include determining which businesses were called by a user and subsequent purchases of goods and/or services made during the call. Furthermore, shopping-related information made through a mobile device can be utilized in interest detection and anticipated purchasing. This can include, in addition to online purchases made through a mobile device, shopping carts on sites such as Amazon, wish lists, watch lists or watched or monitored items on sites like Ebay, etc.

In some embodiments, various factors and weightings can be applied. For example, when assigning categories to calls in the call logs, various calls can be grouped into sets of calls, such as services, purchases, restaurants, etc. These sets of calls are then weighted based on variables associated with calls placed by the mobile device user and the weighting of the call sets is further utilized in prioritizing targeted advertisements to be served to the mobile device user.

As just one example, one potential weighting factor formula could be the following, where SETx represents a particular set of calls grouped together based on at least being assigned to one or more common categories and category importance level is a high, medium, or low value based on various factors associated with the user's call log:

$$\text{Weight\_Factor of (SET}x) = (\text{Number of calls made in SET}x/\text{time period}) + ((\text{Duration in minutes of calls made in SET}x)*(\text{category importance level–high=1, medium =0.6, low=0.2})) - (\text{Time since last call in SET}x) \quad \text{(Equation 1)}$$

In some embodiments, if the user makes a purchase using the coupon, this information is fed back into the system and may be utilized for future selection optimization and for other purposes. Furthermore, the user may be provided with an opportunity to provide additional feedback on the coupon, the advertiser, the purchased product, etc., which feedback may also be stored and utilized.

While the invention is described with reference to the above drawings, the drawings are intended to be illustrative, and the invention contemplates other embodiments within the spirit of the invention.

The invention claimed is:

1. A method comprising:

using one or more computers, obtaining user call history information comprising one or more call records made by a user from a mobile device, wherein the user call history information includes at least a duration of each of the call records, a time stamp for each of the call records, and a recipient of each of the call records;

using one or more computers, based at least in part on the user call history information, generating user call category information comprising assigning one or more categories to each of the call records, wherein the user call category information includes at least a number of the call records assigned to each of the categories and a purchase history of the user related to each of the call records;

using one or more computers, determining one or more category importance levels for each of the one or more categories; and using one or more computers, based at least in part on the user call history information, user call category information, and category importance levels, targeting and serving an advertisement through a mobile application executed or installed on the mobile device associated with the user, the one or more categories assigned to the each of the call records based on the following equation: Weight Factor of (SETx)=(Number of calls made in SETx/time period)+((Duration in minutes of calls made in SETx)*(category importance level))−(Time since last call in SETx), where SETx represents a particular set of calls grouped together based on at least being assigned to one or more common categories and category importance level.

2. The method of claim 1, wherein the category importance levels are determined at least in part by the number of the call records assigned to each of the categories.

3. The method of claim 1, wherein targeting the user with an advertisement is based at least in part on the current time.

4. The method of claim 1, wherein targeting the user with an advertisement comprises serving a visual advertisement to the user on the mobile device.

5. The method of claim 1, wherein targeting the user with an advertisement comprises serving an audio advertisement to the user on the mobile device.

6. The method of claim 1, wherein targeting the user with an advertisement comprises serving an advertisement on the mobile device after a call is completed by the user.

7. The method of claim 1, wherein targeting the user with an advertisement comprises serving an advertisement on the mobile device if the user attempts to call a business matching the one or more categories assigned to previous call records.

8. The method of claim 1, wherein targeting the user with an advertisement comprises serving an advertisement through a mobile application installed on the mobile device.

9. The method of claim 1, wherein targeting the user with an advertisement comprises offering a discount, coupon, or offer to the user through the mobile device.

10. A system comprising:

one or more server computers coupled to a network; and one or more databases coupled to the one or more server computers;

wherein the one or more server computers are configured to:

obtain user call history information comprising one or more call records made by a user from a mobile device, wherein the user call history information includes at least a duration of each of the call records, a time stamp for each of the call records, and a recipient of each of the call records;

based at least in part on the user call history information, generate user call category information comprising assigning one or more categories to each of the call records, wherein the user call category information includes at least a number of the call records assigned to each of the categories and a purchase history of the user related to each of the call records;

determine one or more category importance levels for each of the one or more categories; and based at least in part on the user call history information, user call category information, and category importance levels, target and serve an advertisement through a mobile application executed or installed on the mobile device associated with the user, the one or more categories assigned to the each of the call records based on the following equation: Weight Factor of (SETx)=(Number of calls made in SETx/time period)+((Duration in minutes of calls made in SETx)*(category importance level))−(Time since last call in SETx), where SETx represents a particular set of calls grouped together based on at least being assigned to one or more common categories and category importance level.

11. The system of claim 10, wherein the category importance levels are determined at least in part by the number of the call records assigned to each of the categories.

12. The system of claim 10, wherein the category importance levels are determined at least in part by a length of time elapsed between the call records assigned to each of the categories.

13. The system of claim 10, wherein targeting the user with an advertisement is based at least in part on the current time.

14. The system of claim 10, wherein targeting the user with an advertisement comprises serving a visual advertisement to the user on the mobile device.

15. The system of claim 10, wherein targeting the user with an advertisement comprises serving a visual advertisement to the user on the mobile device.

16. The system of claim 10, wherein targeting the user with an advertisement comprises serving an audio advertisement to the user on the mobile device.

17. The system of claim 10, wherein targeting the user with an advertisement comprises serving an advertisement on the mobile device after a call is completed by the user.

18. The system of claim 10, wherein targeting the user with an advertisement comprises serving an advertisement on the mobile device if the user attempts to call a business matching the one or more categories assigned to previous call records.

19. The system of claim 10, wherein targeting the user with an advertisement comprises serving an advertisement through a mobile application installed on the mobile device.

20. A non-transitory computer readable medium or media containing instructions for executing a method comprising:

using one or more computers, obtaining user call history information comprising one or more call records made by a user from a mobile device, wherein the user call history information includes at least a duration of each of the call records, a time stamp for each of the call records, and a recipient of each of the call records;

using one or more computers, based at least in part on the user call history information, generating user call category information comprising assigning one or more categories to each of the call records, wherein the user call category information includes at least a number of the call records assigned to each of the categories and a purchase history of the user related to each of the call records;

using one or more computers, determining one or more category importance levels for each of the one or more categories, wherein the category importance levels are determined at least in part by a length of time elapsed between the call records assigned to each of the categories; and using one or more computers, based at least in part on the user call history information, user call category information, and category importance levels, targeting and serving the user with an advertisement, wherein targeting the user with an advertisement comprises offering a discount, coupon, or offer to the user through a mobile application executed or installed on the mobile device, the one or more categories assigned to the each of the call records based on the following equation: Weight Factor of (SETx)=(Number of calls made in SETx/time period)+((Duration in minutes of calls made in SETx)*(category importance level))−(Time since last call in SETx), where SETx represents a particular set of calls grouped together based on at least being assigned to one or more common categories and category importance level.

21. The method of claim 1, wherein targeting the user with an advertisement is based at least in part on geo-location of the user.

22. The method of claim 21, wherein the geo-location of the user is determined based at least in part on the user call history information.

23. The method of claim 1, wherein the purchase history of the user related to each of the call records comprises purchases made during a call.

* * * * *